J. P. LONG.
BEE-HIVE.

No. 192,520. Patented June 26, 1877.

Attest:
August Petersohn
M. S. Ditmer.

Inventor:
John P. Long,
by Louis Bagger & Co.
Att'ys.

UNITED STATES PATENT OFFICE.

JOHN P. LONG, OF DELAWARE, OHIO, ASSIGNOR OF ONE-HALF HIS RIGHT TO HARRISON W. HUFF, OF SAME PLACE.

IMPROVEMENT IN BEE-HIVES.

Specification forming part of Letters Patent No. 192,520, dated June 26, 1877; application filed May 21, 1877.

*To all whom it may concern:*

Be it known that I, JOHN P. LONG, of Delaware, in the county of Delaware and State of Ohio, have invented certain new and useful Improvements in Bee-Hives; and I do hereby declare that the following is a full, clear, and exact description thereof, which will enable others skilled in the art to which it appertains to make and use the same, reference being had to the accompanying drawings, which form a part of this specification, and in which—

Figure 1:
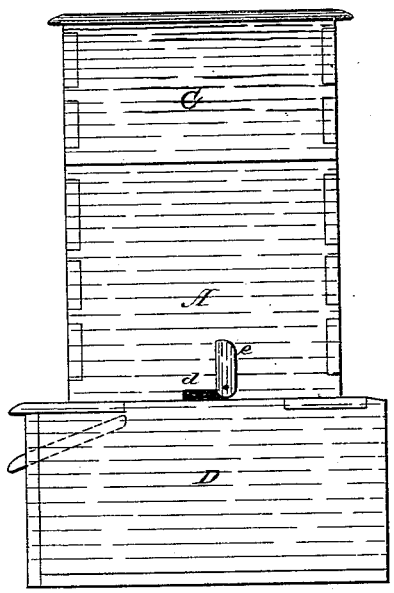
Figure 2:
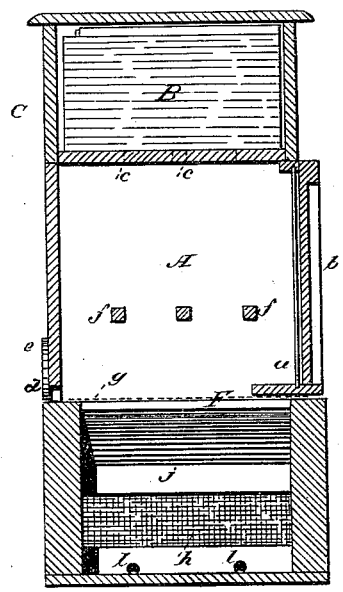
Figure 3:
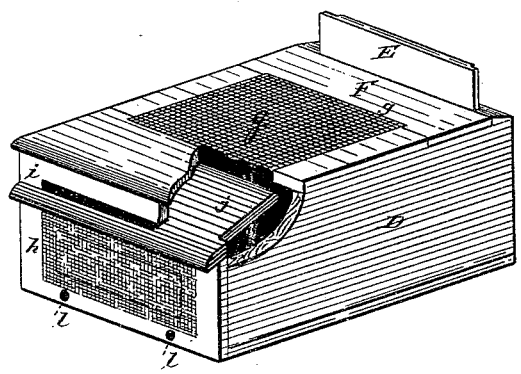

Figure 1 is a front elevation. Fig. 2 is a section through the hive and moth-trap, and Fig. 3 is a perspective view of the moth-trap detached.

Similar letters of reference indicate corresponding parts in all the figures.

This invention relates to that class of bee-hives which are provided with a special chamber set aside as a trap for moths and "robber-bees;" and it consists in the improved construction and arrangement of parts hereinafter more fully shown and described.

In the drawing, A is the hive-box. This is an ordinary square box having one or more glazed sides, $a$ $a$, through which its contents may be inspected by removing the slides $b$, which cover and protect the glass sides. The top of the hive-box has slots $c$ $c$, above which are placed the honey-boxes B B, which are covered by a removable top or cap-piece C. This latter is made somewhat smaller than the hive-box in order to enable the slide or slides $b$ to be easily operated without removing it.

The hive-box, which is bottomless, has a bee-entrance, $d$, arranged to be closed or covered by a slide, $e$; it is also provided with cross-bars $f$ $f$, for the bees to build from, or with comb-frames, detachable, or otherwise, of any suitable construction.

D is a low square box, somewhat longer than the hive-box A, which is placed upon it. At its rear end it has a slide or door, E, and on top it has a square opening, F, the dimensions of which are about equal to the inside measure of box A, which is placed directly over it. This opening is covered with wire-gauze $g$, coarse enough to allow the broken pieces of comb and other offal from the hive to fall through it into the box below, yet fine enough to prevent the moths from passing through it into the hive. The front of the box is covered by fine wire-gauze $h$, below which are one or more slanting perforations or moth-entrances $l$ $l$; above the gauze $h$ is a slot, $i$, in front of which is a board or bracket, $j$, which slants upward into the box.

When the hive is in use the offal and impurities from box A fall through the gauze $g$ down into the trap-box D. The hive is in this manner kept clean. The hive-entrance $d$ being guarded by the bees, moths and robber-bees will take to the entrances $l$ $i$, through which they pass into the trap, where they will perish. Eggs deposited by the moths in the offal in bottom of trap may be removed through slide-door E and destroyed.

Having thus described my invention, I claim, and desire to secure by Letters Patent of the United States—

1. The trap-box D, having slide-door E, wire-gauze top $g$, upward-slanting entrances $l$ $i$, and wire-gauze front $h$, substantially as and for the purpose herein shown and specified.

2. In combination with the trap-box D, having top opening F covered with wire-gauze $g$, the bottomless hive-box A, substantially as and for the purpose herein shown and specified.

In testimony that I claim the foregoing as my own I have hereto affixed my signature in presence of two witnesses.

JOHN P. LONG.

Witnesses:
F. M. MARRIOTT,
JAMES ALLAN.